United States Patent [19]

Ward

[11] 4,113,691

[45] Sep. 12, 1978

[54] POLYMERIC ORGANOSILICON COMPOUNDS

[75] Inventor: Robert James Ward, Somerville, N.J.

[73] Assignee: Union Carbide Corporation, New York, N.Y.

[21] Appl. No.: 773,776

[22] Filed: Mar. 2, 1977

[51] Int. Cl.$^2$ ............................................. C08L 63/02
[52] U.S. Cl. ................................. 260/37 EP; 528/29; 260/824 EP; 427/214; 427/221; 427/387; 427/407 R
[58] Field of Search ........ 260/824 R, 824 EP, 47 EP, 260/37 EP; 427/387, 221, 214, 407 R

[56] References Cited

U.S. PATENT DOCUMENTS

| | | | |
|---|---|---|---|
| 3,150,116 | 9/1964 | Masters | 260/47 EP C |
| 3,306,800 | 2/1967 | Plueddemann | 260/824 R |
| 3,388,079 | 6/1968 | Vandenbert | 260/47 EP X |
| 3,417,053 | 12/1968 | Chalk | 260/824 R X |
| 3,461,027 | 8/1969 | Plueddemann | 427/407 R X |
| 3,833,405 | 9/1974 | Lee et al. | 260/47 EP X |

*Primary Examiner*—Lewis T. Jacobs
*Attorney, Agent, or Firm*—Peter R. Shearer

[57] ABSTRACT

Novel compounds comprising poly(diphenylene ether) backbones having hydrolyzable organosilicon groups bonded thereto are useful in improving adhesion between resinous media and inorganic oxide surfaces.

12 Claims, No Drawings

POLYMERIC ORGANOSILICON COMPOUNDS

BACKGROUND OF THE INVENTION

Organosilicon compounds have been employed for some time in the treatment of inorganic oxide surfaces, such as inorganic oxide films, particulate fillers and pigments, and fibers (such as glass fibers, steel fibers and aluminum fibers). Aluminum and steel fibers are regarded to be oxide surfaces because they are oxidized even though their subsurfaces are not. The typical organosilicon treatment involves coating such a surface with a hydrolyzate (and/or condensate of the hydrolyzate) of an organofunctional hydrolyzable silane. As a rule, the treatment enhances bonding between the inorganic oxide surface and resinous media and, consequently, has utility as a primer treatment in the application of coatings, adhesives or sealants to inorganic oxide surfaces and as a filler pretreatment to improve the strength and structural integrity of filled resin composites such as glass fiber reinforced plastics. Such organofunctional hydrolyzable silanes are termed "Coupling Agents" or "Adhesion Promoters."

In addition to the improvement of bonding, coupling agents have found other uses related to their ability to alter the surface characteristics of inorganic oxides, such as their application to glass fibers as a size during processing and their use as dispersing aids for inorganic oxide pigments (e.g., titanium dioxide).

Another conventional technique for supplying the coupling agent to the inorganic oxide surface is by the integral blending technique. This technique involves adding to the esin medium the desired amount of the coupling agent and providing the medium in contact with the inorganic oxide surface by supplying the latter as a particulate filler or fiber to the medium or supplying the medium with the coupling agent to a continuous surface of the inorganic oxide in the form of a film, fabric, foil or other shapes, wherein the coupling agent migrates within the medium to contact the inorganic oxide surface or surfaces, react thereat and couple with the medium under the molding, curing and other shaping conditions.

The organofunctional hydrolyzable silane contains at least one, and as many as three, hydrolyzable groups, each of which is bonded to a silicon atom. Typical hydrolyzable groups include alkoxy of 1 to about 4 carbon atoms, alkoxyalkoxy containing up to about 6 carbon atoms, halogen such as chlorine, fluorine and bromine, acyloxy of 2 to about 4 carbon atoms, phenoxy and oxime. The preferred hydrolyzable groups are alkoxy, alkoxyalkoxy and acryloxy. Common organofunctional groups are bonded to the silicon by a carbon to silicon bond. The typical commercial functional radicals present in the organofunctional groups are vinyl, methacryloxy, primary amino, beta-aminoethylamino, glycidyl, epoxycyclohexyl, mercapto, polysulfide, ureido, and polyazamide. The organofunctional groups are usually quite small in relation to the molecules of the resin medium.

The coupling agent is typically supplied to the surface of the inorganic oxide material as a hydrolyzate in the presence of a hydrolyzing agent such as dilute acetic acid or sodium hydroxide solution. The coupling agent molecules are subsequently bonded to the inorganic oxide surface through siloxy moieties ($\equiv$Si—O—) by condensation of the silanol groups of the coupling agent and the hydroxyl groups of the inorganic oxide material. Additionally, the silicon atoms of individual coupling agent molecules may become bonded to each other through oxy moieties (—O—) by a similar process of hydrolysis and condensation. It is not necessary to supply a hydrolyzing agent to the inorganic oxide surface if sufficient ambient moisture is present at the inorganic oxide surface to effect hydrolysis of the hydrolyzable groups. The coupling agent becomes bonded to the resinous medium through a chemical reaction between the reactive organofunctional group of the coupling agent and the complementarily reactive groups in the medium.

Those skilled in the art are fully aware that there are a number of problems associated with the use of the coupling agents of the prior art, particularly with their use in conjunction with non-reactive resin media. The bonds between the coupling agent and the inorganic oxide surface can be disrupted by hydrolysis in the presence of water. Likewise, the bonds between silicon atoms of individual coupling agent molecules are subject to attack by hydrolysis. This problem is compounded when the coupling agent is used in a non-reactive resin in that only minimal bonding, primarily of an associative or van der Waals type, can be achieved between the medium and the coupling agent. Thus, the wet strength of resin/inorganic oxide composites using coupling agents of the prior art is particularly poor when the coupling agent is used with a non-reactive resin medium. This may be due, at least in part, to the displacement of coupling agent molecules from the inorganic oxide surface under hydrolysis conditions, wherein the bonds between the coupling agent and inorganic oxide surface and the bonds between the silicon atoms of individual coupling agent molecules are disrupted by hydrolysis and the weak associative bond between the resin medium and the coupling agent is insufficient to prevent displacement of the coupling agent. Moreover, since bonding between the resin medium and the coupling agent occurs substantially at the interface, a boundary layer is created along which cleavage can occur.

SUMMARY OF THE INVENTION

There is described herein a polymeric organosilicon compound which comprises a substantially non-reactive polyether organo backbone having numerous pendent organosilicon groups bonded thereto which contain hydrolyzable groups. This organosilicon compound should not be classically termed a coupling agent, yet it is used in much the same manner as coupling agents to enhance bonding between inorganic oxide surfaces and resinous media. Unlike coupling agents of the prior art, however, the compounds of this invention can be used with equally good results in non-reactive and reactive resin media. Further, resin/inorganic oxide bonding effected with the use of the compounds of this invention have excellent wet strength. Throughout this specification the compounds of the present invention will be referred to by the generic term "polymeric adhesion promoters."

DESCRIPTION OF THE INVENTION

The polymeric adhesion promoters of this invention are organosilicon-grafted polyethers having weight average molecular weights of from 1,000 to 100,000 and preferably from 10,000 to 60,000. The organo-silicon-grafted polyethers are characterized by the repeating units:

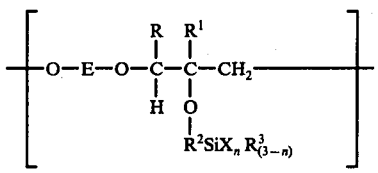
(I)

wherein R and R[1] are each, individually, hydrogen or methyl; E is the residue obtained by removing the hydroxyl groups from a dihydric polynuclear phenol in which the hydroxyl groups are attached to different nuclei; R[2] is a divalent organic radical defined more fully hereinafter; R[3] is hydrogen or alkyl of up to 4 carbon atoms, which may be straight or branched chain; n is an integer having a value of from 1 to 3 and is preferably 3; and X is a hydrolyzable group. There is an additional proviso that the compounds of this invention contain from 0.5 to 5.5 weight per cent, and preferably from 2 to 5.5 weight percent silicon, based on the weight of the compound.

Those skilled in the art will recognize that removal of the $-R^2SiX_nR^3_{(3-n)}$ groups from the organo-silicon-grafted polyethers characterized by the repeating groups of formula I yields a residue which is identical to the residue obtained by removing the hydroxyl hydrogen atoms from the known poly(hydroxyethers) obtained by the reaction of dihydric polynuclear phenols such as, for example, 2,2-bis-(p-hydroxyphenyl)-propane (commonly known as bisphenol-A) and epihalohydrins such as, for example, epichlorohydrin, which reaction products are suitable precursors for the organosilicon-grafted polyethers of this invention. Suitable poly(hydroxyethers) which can be used as precursors in preparing the organo-silicon grafted polyethers of this invention include, but are not limited to, those described in U.S. Pat. No. 3,305,528, U.S. Pat. No. 3,297,747, and U.S. Pat. No. 2,601,075, the disclosures of which are incorporated herein by reference.

In formula I above, E can more fully be described as the residue obtained by removing te hydroxyl groups from a dihydric polynuclear phenol of the formula:

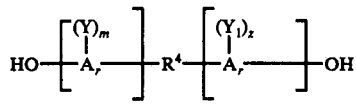

wherein: $A_r$ is an aromatic divalent hydrocarbon radical such as naphthylene and phenylene with phenylene being preferred for purposes of this invention: Y and $Y_1$, which can be the same or different, are alkyl radicals such as methyl, n-propyl, n-butyl, n-hexyl, n-octyl and the like, preferably alkyl radicals having a maximum of 4 carbon atoms; or halogen atoms, i.e., chlorine, bromine, iodine, or fluorine; or alkoxy radicals such as methoxy, methoxy-methyl, ethoxy, ethoxyethyl, n-butoxy, amyloxy and the like, preferably an alkoxy radical having a maximum of 4 carbon atoms. It is to be understood that whenever there are substituents exclusive of the hydroxyl groups on either or both of the aromatic divalent hydrocarbon groups, that these substituents can be the same or different, m and z are integers having a value of from 0 to a maximum value corresponding to the number of hydrogen atoms on the aromatic ring ($A_r$), which can be replaced by substituents and can have the same or different values; and R[4] is a divalent radical, as for example

or —O—, or —S—, or —SO—, or —SO$_2$—, or —S—S—, or a divalent hydrocarbon radical, as for example, an alkylene radical such as methylene, ethylene, trimethylene, tetramethylene, pentamethylene, hexamethylene, 2-ethyl hexamethylene, octamethylene, nonamethylene, decamethylene, and the like; an alkylidene radical such as ethylidene, propylidene, isopropylidene, isobutylidene, amylidene, isoamylidene, 1-phenyl ethylidene and the like, or a cycloaliphatic radical, such as 1,4-cyclohexylene, 1,3-cyclohexylene, cyclohexylidene, and the like, or halogenated alkylidene, alkylene or cycloaliphatic radicals, alkoxy and aryloxy substituted alkylidene, alkylene or cycloaliphatic radicals, such as methoxy methylene, ethoxy methylene, ethoxy ethylene, 2-ethoxy trimethylene, 3-ethoxy pentamethylene, 1,4-(2-methoxycyclohexane), phenoxy ethylene, 2-phenoxy trimethylene, 1,3-(2-phenoxy cyclohexane), and the like, aralkylene radicals, such as phenyl ethylene, 2-phenyl trimethylene, 1-phenyl pentamethylene, 2-phenyl decamethylene, and the like, aromatic radicals, such as phenylene, naphthylene, and the like, halogenated aromatic radicals, such as 1,4-(2-chlorophenylene), 1,4-(2-bromophenylene), 1,4-(2-fluorophenylene), and the like; alkoxy and aryloxy substituted aromatic radicals, such as 1,4-(2-methoxyphenylene), 1,4-(2-ethoxyphenylene), 1,4-(2-n-propoxyphenylene), 1,4-(2-phenoxyphenylene), and the like, alkyl substituted aromatic radicals such as 1,4-(2-methylphenylene), 1,4-(2-ethylphenylene) 1,4-(2-n-propylphenylene), 1,4-(2-n-butylphenylene), 1,4-(2-n-dodecylphenylene) and the like; or R[4] can be a ring which is fused to one of the $A_r$ groups as is the case, for example, in the compound having the formula:

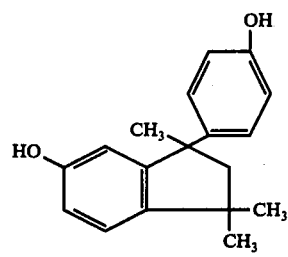

or $R_1$ can be a polyalkoxy radical such as polyethoxy, polypropoxy, polythioethoxy, polybutoxy, polyphenylethoxy; or $R_1$ can be a radical containing a silicon atom as, for example, polydimethylsiloxy, polydiphenylsiloxy, polymethylphenylsiloxy and the like; or R[4] can be two or more alkylene or alkylidene radicals separated by an aromatic ring, a tertiary amino group, an ether linkage, a carbonyl group or separated by a linkage containing sulfur such as sulfur, sulfoxide and the like.

The preferred E groups are those having the formula:

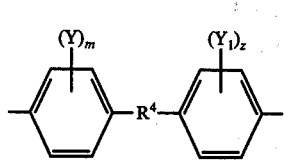

wherein Y and $Y_1$ are as previously defined; m and z have values of from 0 to 4 inclusive; and $R^4$ is an alkylene or alkylidene group, preferably having from 1 to 3 carbon atoms.

In formula (I), X can be any of the hydrolyzable groups which were previously mentioned as being suitable hydrolyzable groups in coupling agents of the prior art, the preferred hydrolyzable groups being alkoxy of 1 to 4 carbon atoms.

$R^2$ can be any divalent organic radical which effectively bonds the remainder of the molecule to the silicon atom. In essence, $R^2$ is an inert moiety to the invention because the invention serves the function which contemplates two components joined together into one molecule. The first component constitutes a plurality of segments which contain the silicon bonded hydrolyzable groups, said segments each being a group of the formula $-SiX_nR^3_{(3-n)}$ and the second component is the polyether backbone. Thus, $R^2$ can be any of a broad range of divalent organic groups which can form stable bridges between the said components.

Illustrative of suitable $R^2$ substituents one can list the following:

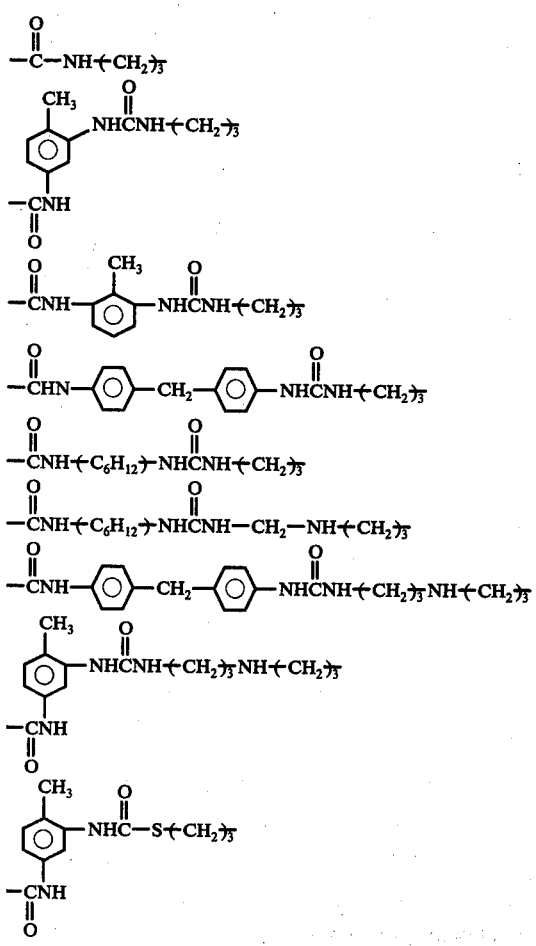

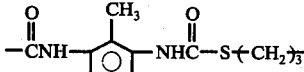
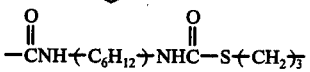
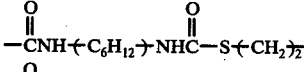
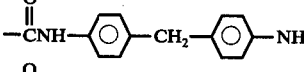
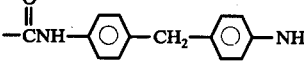
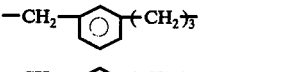
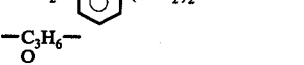
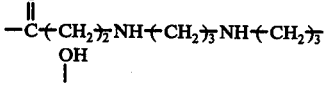
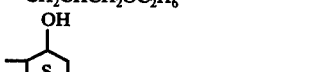
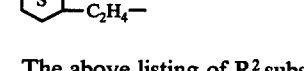
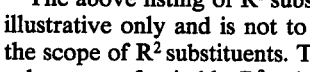

The above listing of $R^2$ substituents is intended to be illustrative only and is not to be construed as limiting the scope of $R^2$ substituents. The full scope and chemical nature of suitable $R^2$ substituents is more readily understood and appreciated when one considers the methods by which the compounds of this invention can be produced.

The compounds of this invention are conveniently produced by grafting reactive organofunctional silanes containing hydrolyzable groups onto poly(hydroxyethers), said poly(hydroxyethers) being the reaction products of dihydric polynuclear phenols and epihalohydrins previously described, and being characterized by the repeating unit:

$$\left[ -O-E-O-\underset{H}{\overset{R}{\underset{|}{C}}}-\underset{OH}{\overset{R^1}{\underset{|}{C}}}-CH_2- \right] \quad (II)$$

wherein E, R and $R^1$ are as previously defined. The conditions under which the reactions between dihydric polynuclear phenols and epihalohydrins proceed are well known in the art.

The reactive organofunctional silane is grafted onto the poly(hydroxyether) by a reaction which occurs at the hydroxyl groups illustrated in formula II. Grafting can be effected by a direct reaction wherein the reactive group of the reactive organofunctional silane is one which is coreactive with the hydroxyl group. For example, an isocyanatofunctional silane such as gamma-isocyanatopropyltriethoxysilane can be reacted with the poly(hydroxyether) to produce a polymeric adhesion promoter having a urethane-containing $R^2$ segment such as illustrated by formula (1) above. The urethane producing reaction and conditions under which it proceeds will be well understood by those skilled in the art. The reaction is usually carried out in the presence of a suitable urethane catalyst. Illustrative of suitable catalysts one can mention the stannous salts of carboxylic acids such as stannous octoate, stannous oleate, stannous acetate and stannous laurate; dialkyltin dicarboxylates such as dibutyltin dilaurate, dibutyltin diacetate, dilauryltin diacetate, dibutyltin di(2-ethylhexanoate); dialkyltin oxides; trialkyltin oxides, tertiary amines; and tin mercaptides such as di-n-octyltin mercaptide. Other suitable catalysts will be known to those skilled in the art. The catalyst is generally employed at a concentration of from 0.01% to 10%, preferably from 0.01% to 1%, based on the weight of the reactants. The reaction proceeds satisfactorily at a temperature of from 1° C. to 150° C., and is preferably carried out at from room temperature to 100° C.

While the reaction can be carried out in the absence of solvent by maintaining the poly(hydroxyether) in the melt stage during the reaction, it is preferred to employ a solvent in which th poly(hydroxyether) is soluble and which is inert to the reactants. Those skilled in the art will recognize which solvents are suitable, however, one can mention as being merely illustrative thereof acetone, methyl ethyl ketone, methyl isobutyl ketone, diisobutylketone, 2-ethoxyethyl acetate, 2-methoxyethyl acetate, tetrahydrofuran, 2-ethylhexyl acetate, cyclohexanone and 2-nitropropane. The solvent can be employed at a concentration of up to 95 weight percent, preferably from 50 to 80 weight percent. The reaction time can vary from a few hours to a month, depending on catalysis, temperature, etc. Typically, the reaction was carried to completion in about 4 hours using 300 ppm, based on the weight of reactants, of dibutyltin dilaurate at a reaction temperature of about 60° C. Because of their ready availability, and the ease and rapidity with which they can be reacted with the poly(hydroxyether), it is preferred to employ isocyanato-silanes in producing the compounds of this invention, gamma-isocyanatopropyltriethoxysilane being most preferred.

Alternatively, the polymeric adhesion promoters of this invention can be produced by the direct reaction of the poly(hydroxyether) with an organofunctional silane having a reactive group, other than an isocyanato group, which is coreactive with the hydroxyl group, such as halo or oxirane. For example, β-chloromethylphenylpropyltriethoxysilane can be reacted with the poly(hydroxyether) to produce a polymeric adhesion promoter having as its R² substituent the moiety illustrated in formula (15). Similarly, chloropropyltriethoxysilane can be reacted with the poly(hydroxyether) to produce a polymeric adhesion promoter of this invention having an R² substituent as illustrated by formula (17).

Illustrative of yet another method of grafting the organofunctional silane groups to the polymer backbone by direct reaction is the reaction of an oxirane-functional organosilane such as glycidoxypropyltrimethoxysilane or beta-(3,4-epoxycyclohexyl)ethyltrimethoxysilane with the poly(hydroxyether), resulting in the formation of an R² substituent as illustrated in formulas (20) and (21). The reaction between the oxirane group and the hydroxyl group is one which will be immediately understood by those skilled in the art and they will know the conditions under which such reactions proceed without further elaboration herein. The polymeric adhesion promoters produced by this method, athough they are useful, are somewhat less desirable than those produced by the other methods described herein, because they contain hydroxyl groups which can engage in undesirable reactions with the hydrolyzable groups.

Other methods of grafting the organofunctinal silane groups onto the polymer backbone involve first reacting a difunctional organic compound with the poly(hydroxyether) (or with a reactive organofunctional silane containing silicn-bonded hydrolyzable groups) to form a monofunctional intermediate which is subsequently reacted with the reactive organofunctional silane (or the poly(hydroxyether). The difunctional organic compound can be any one in which at least one of the functional groups is corrective with the hydroxyl groups of the poly(hydroxyether), at least one of the functional groups is coreactive with the reactive organofunctional silane, and the remaining segment is an essentially inert moiety. For purposes of defining the difunctional organic compound, an ethylenically unsaturated site capable of undergoing reaction with the organofunctional group of the reactive organofunctional silane is considered a functional group. Typically, the difunctional organic compound is an organic diisocyanate, p,p'-diphenylmethane diisocyanate and the like. By employing an organic diisocyanate in this manner a number of reactive organofunctional silanes which are widely commercially available, but which are not directly coreactive with the poly(hydroxyether) can thereby be conveniently grafted to the copolymer or terpolymer backbone. For example, the organic diisocyanate can be reacted with a primary amino-silane (e.g., gamma-aminopropyltriethoxysilane or N-beta-(Aminoethyl)-gamma-amino-propyl trimethoxysilane) to produce an isocyanato-silane which contains a urea segment

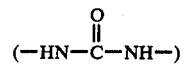

and the isocyanato-silane thus produced is subsequently reacted with the poly(hydroxyether). Typical R² groups which are produced by the foregoing reaction sequence are illustrated by formulas (2) through (8). Alternatively, the organic diisocyanates can first be reacted with a mercapto-silane (e.g., gamma-mercaptopropyltrimethoxysilane) to produce an isocyanatofunctional organosilane containing the segment.

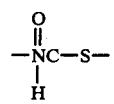

which is subsequently reacted with the poly(hydroxyether). Typical R² groups which are thus produced are illustrated by formulas (9) through (14).

Other difunctional compounds which are useful in producing the polymeric organosilicon compounds of this invention are the halide salts of alpha, beta-unsaturated carboxylic acids, such as acryloyl chloride. The halide salt is first reacted with the poly(hydroxyether), resulting in esterification of the hydroxy groups with the generation of HCl as a byproduct. The esterified poly(hydroxyether) is subsequently reacted with a reactive organofunctional silane wherein the organofunctional group contains a labile hydrogen atom, such as an amino-silane, in the presence of sodium amide or sodium alkoxide. The labile hydrogen atom of the reactive organofunctional group adds across the alpha, beta-unsaturated bond in a Michael condensation, resulting in $R^2$ groups of the type illustrated by formulas (18) and (19). The conditions under which these reactions proceed will be known to those skilled in the art.

All the foregoing methods of producing the polymeric adhesion promoters of this invention are described for purposes of illustration only and are not intended to limit the scope of the invention in any way. It will be apparent to one skilled in the art from the foregoing discussion that many possible molecuar structures are contemplated within the scope of the polymeric adhesion promoters of this invention, and particularly as the $R^2$ substituent thereof, and that the individual structures are too numerous to list herein.

It is to be understood that, in producing the polymeric adhesion promoters of this invention, it is not necessary, although it is usually desirable, that all the hydroxyl groups of the poly(hydroxyether) be reacted; that is, there can be residual hydroxyl groups present in the polymeric adhesion promoter, provided that sufficient hydroxyl groups are substituted to provide the aforesaid concentration of silicon in the polymeric adhesion promoter.

The inorganic oxide which can be beneficially treated by the polymeric adhesion promoters defined above is any inorganic solid material which possesses either oxygen (chemisorbed or covalently bonded) or hydroxy (bonded or free) at its exposed surface, and includes any material which can be treated by coupling agents known in the prior art. The inorganic oxide material can be in any form, including particles of irregular or regular (e.g., spherical) shape, individual fibers, woven fiber mats or fabric, or continuous surfaces such as sheets, films, slabs, and formed shapes. Specific illustrations of suitably employed inorganic oxide materials are, for example, brass (with an oxidized surface), copper metal (oxidized at its surface), aluminum metal (oxidized at its surface), iron or steel (oxidized at its surface), alumina, aluminum trihydrate, siliceous materials such as fumed silica, hydrated silica (precipitated silica) silica aerogels, silica xerogels, aluminum silicates, calcium magnesium silicate, asbestos, glass fibers, clays, molecular sieves, Wallostonite, calcium carbonate, carbon black (including lamp black), titanium dioxide (including titanium dioxide which contains HCl soluble alumina and/or silica), calcium sulphate, magnesium sulfate, calcium carbonate containing a silica coating or agglomerated to silica, and the like.

The polymeric adhesion promoters of this invention can be used in essentially the same manner as coupling agents known in the prior art, although the mechanism by which they function is not the same. The polymeric adhesion promoter can be supplied to the surface of the inorganic oxide material as a hydrolyzate prior to contacting the inorganic oxide material with the resinous medium or the polymeric adhesion promoter can be blended into the resinous medium and the resinous medium thereafter brought into contact with the inorganic oxide under hydrolysis conditions (i.e., integral blending). Where it is desired to use the polymeric adhesion promoter to improve adhesion between the resin and a continuous surface of inorganic oxide, such as a sheet of inorganic oxide material, the polymeric adhesion promoter can be applied as a primer coating to the surface in the form of a solution by any suitable means such as brushing or spraying.

Additionally, any other means known in the prior art for applying coupling agents to inorganic oxide surfaces can be employed to apply the polymeric adhesion promotes of this invention to inorganic oxide surfaces.

The hydrolysis and subsequent condensation or partial condensation which causes bonding of the polymeric adhesion promoter to the inorganic oxide surface is brought about under the same conditions as is the bonding of conventional silane coupling agents to inorganic oxide surfaces. Those skilled in the art are aware that ambient moisture at the inorganic oxide surface is usually sufficient to effect the bonding, however, water can be provided to the surface to facilitate hydrolysis and in some cases it has been found beneficial to provide to the surface as a hydrolyzing agent a dilute acid or base solution such as dilute acetic acid or NaOH in water. Moreover, the molecular entanglement between the polymer backbone of the polymeric adhesion promoter and the resin medium extends into the resin medium well beyond the interface between the polymeric adhesion promoter and the resin medium. By comparison, conventional coupling agents, with relatively small organo moieties, bound to the resin primarily at the interface, thus creating a boundary layer of bonds along which cleavage can occur.

The following examples are presented to further illustrate the invention described herein and are not to be construed as limiting the scope of the invention. Unless otherwise specified all parts and percents are by weight.

For the sake of brevity in the examples, the designations in the first column of Table I will be used in lieu of the more complete description given in the second column.

Table I

| Designation | Composition |
| --- | --- |
| Poly(hydroxyether) A | reaction product of 2,2-bis-(p-hydroxyphenyl)-propane and epichlorohydrin having a weight average molecular weight of 20,000 |
| Poly(hydroxyether) B | A reaction product of 2,2-bis-(p-hydroxyphenyl)-propane and epichlorohydrin having a weight average molcular weight of 5,000 |
| Epoxy resin A | A reaction product of 2,2-bis-(p-hydroxyphenyl)-propane and epichlorohydrin having a number average molecular weight of 380 |
| Curing agent A | A liquid epoxy curing agent which is an adduct of dimerized linoleic acid and triethylenetetramine. |
| Polyurethane A | An adduct of 57.6 gram of p,p'-diphenylmethone diisocyanate, 5.82 grams of ethylene glycol, 211 grams of butanediol and 232.8 grams of a polycaprolactone polyol having a weight average molecular weight of 2,000 and a hydroxyl number of 56.1, supplied as a 30% solids solution in acetone. |
| Polyurethane B | A thermoplastic polyurethane resin supplied by K.J. Quinn, Inc. under the name Qthane$^R$-PA 30. |

EXAMPLE 1

To a 1-liter, four-necked glass reaction kettle equipped with a stirrer, thermometer, heating mantle, and reflux condenser was charged 27.8 grams of a poly(hydroxyether)A. The polyhydroxyether in the kettle was heated to 100° C. and held under vacuum for 30 minutes to remove moisture. The poly(hydroxyether) was cooled to 50° C. under a dry nitrogen blanket and 218.2 grams of anhydrous tetrahydrofuran, 26.75 grams of gamma-isocyanatopropyltriethoxysilane, and 300 ppm, based on the weight of the reactants, of dibutyltin dilaurate were added to the kettle. The reactants were heated to 60° C. and held at that temperature for 4 hours, after which time infrared spectroscopic analysis showed complete disappearance of the isocyanate band, indicating complete reaction to produce a polymeric adhesion promoter. The contents of the reaction kettle were cooled to room temperature. The polymeric adhesion promoter thus produced was admixed with a 20% solids solution of Estane 5711 thermoplastic polyurethane resin in methyl ethyl ketone in two portions, one of which contained 2% polymeric adhesion promoter (solids), based on the weight of Estane 5711 (solids) and the other of which contained 0.25% polymeric adhesion promoter. Canvas-/aluminum laminates were then prepared using each of the mixtures as an adhesive by applying two coats of the mixture to a canvas strip using a ⅜ inch NC threaded rod and one coat to an aluminum surface using a No. 70 wire wound rod and then laminating the coated canvas and aluminum with a hand roller. The canvas/aluminum laminates were each steamed for 1 hour to induce rapid hydrolysis of the polymeric adhesion promoter at the aluminum surface and subsequently heated in an oven at 105° C. for 1 hour to cause condensation. Each of the laminates was then aged 3 weeks under water at ambient temperature and tested for 180° peel strength (at 2 in./min.) while still wet. As controls, canvas/aluminum laminates were prepared and tested in a similar manner using as the adhesive Estane 5711 resin alone and 2% concentration mixtures of δ-isocyanatopropyltriethoxysilane in Estane 5711, δ-glycidoxypropyltrimethoxysilane in Estane 5711, and δ-mercaptopropyltrimethoxysilane in Estane 5711. The results are reported in the table below.

| Resin additive | % additive[1] | % Si[1] | Peel strength, lb./in. |
|---|---|---|---|
| — | 0 | 0 | 7 |
| PAP[2] | 0.25 | 0.01 | 29 |
| PAP | 2.0 | 0.10 | 40 |
| A[3] | 2.0 | 0.22 | 6 |
| B[4] | 2.0 | 0.24 | 2.5 |
| C[5] | 2.0 | 0.28 | 0.6 |

[1]Based on wright of Estane 5711 + polymeric adhesion promoter (solids)
[2]PAP = polymeric adhesion promotor
[3]A = γ-isocyanatopropyltriethoxysilane
[4]B = γ-glycidoxypropyltrimethoxysilane
[5]C = γ-mercaptopropyltrimethoxysilane

EXAMPLE 2

To a 1-liter, four-necked glass reaction kettle equipped with a stirrer, thermometer, heating mantle, reflux condenser, and Dean-Stark water separator there were charged 80 grams of poly(hydroxyether) A and 186.6 grams of diethylketone. The mixture was heated at 102° C. under a nitrogen blanket for 30 minutes to dissolve the poly(hydroxyether) and 53.3 grams of xylene were added. The mixture was refluxed at 106° C. for 5 hours to remove water azeotropically. There were added to the mixture in the kettle 79.62 grams of gamma-isocyanatopropyltriethoxysilane and 0.155 gram of an organotin mercaptide catalyst, M&T Chemicals, Inc.'s Thermolite ®-31. The reactants were maintained at 100° C. for 3 hours, after which infrared spectroscopic analysis showed disappearance of the isocyanate band, indicating complete reaction of the reactants to produce a polymeric adhesion promoter. The reaction product was cooled and diluted with 256 grams of tetrahydrofuran. Adhesives were produced by admixing the diluted reaction product with portions of polyurethane A and Estane 5711 polyurethane resin at a concentration of 2% polymeric adhesion promoter (solids), based on the weight of polyurethane. Using a procedure similar to that of Example 1, canvas/aluminum laminates were prepared using the adhesives. Peel strengths were determined for the dry laminates and for laminates which had been aged in water for 1 week at ambient temperature. As controls, canvas/aluminum laminates were prepared using the polyurethane resins alone as the adhesives. Results appear in the table below. It can be seen that both polyurethane resins showed substantially improved wet adhesive properties when treated with the polymeric adhesion promoter.

| Adhesive | Peel strength, lb./in. | |
|---|---|---|
|  | Dry | Wet |
| Polyurethane A + PAP* | 49 | 28 |
| Polyurethane A | 46 | 14 |
| Estane 5711 + PAP | 15 | 12 |
| Estane 5711 | 6 | 0.6 |

EXAMPLE 3

Using the same equipment as Example 2, there were charged to the kettle 100 grams of poly(hydroxyether) A and 236 grams of 2-ethoxyethyl acetate. The temperature was raised to 100° C. over 2 hours to effect solution, 73 grams of toluene were added, and the contents of the kettle were refluxed at 142° C. for 3½ hours to remove water azeotropically. The contents of the kettle were cooled to 100° C. and 99.77 grams of gamma-isocyanatopropyltriethoxysilane and 0.2 grams of an organotin mercaptide catalyst, M&T Chemicals, Inc.'s Thermolite ®-31 were added. The reactants were maintained at 85° C. to 100° C. for about 2 hours, after which time infrared spectroscopic analysis showed disappearance of the isocyanate band, indicating complete reaction to produce a polymeric adhesion promoter. The reaction product was diluted with 312 grams of anhydrous 2-ethoxyethyl acetate. By a procedure similar to that of Example 1, canvas/aluminum laminates were produced using as the adhesive a mixture of polyurethane A and the polymeric adhesion promoter of this example, at a concentration of 2% polymeric adhesion promoter (solids), based on the weight of polyurethane A. After one week of aging in air at ambient conditions a laminate thus produced had a 180° peel strength of 46 lb./in. while another laminate, which had been aged in water at ambient temperature had a 180° peel strength, tested while wet, of 54 lb./in.

EXAMPLE 4

Using the same equipment as Example 2, there were charged to the kettle 278 grams of poly(hydroxyether) A, 869 grams of 2-ethoxymethyl acetate, and 0.54 gram of organotin mercaptide catalyst, M&T Chemicals, Inc.'s Thermolite ®-31. The mixture in the kettle was heated at 130° C. for about 2 hours to effect solution, 289.6 grams of toluene were added, and the mixture was refluxed at 133° C. for 1½ hours to remove water azeotropically. The mixture in the kettle was cooled to 60° C. and 264.15 grams of gamma-isocyanatopropyltriethoxysilane were added to the mixture. The reaction was carried out at 60° C. for 2½ hours, the reaction mixture was cooled to room temperature and allowed to stand overnight under a nitrogen blanket, and the reaction was resumed after reheating the reaction mixture to 60° C. and continued for 3 hours. Infrared spectroscopic analysis showed disappearance of the isocyanate band, indicating complete reaction to produce a polymeric adhesion promoter. The polymeric adhesion promoter thus produced was admixed with portions of polyurethane B (30% solids in methyl ethyl ketone) in varying concentrations. The polyurethane resins containing the polymeric adhesion promoter were employed as adhesives to produce canvas/aluminum laminates by a procedure similar to that used in Example 1. The canvas/aluminum laminates were aged 3 weeks under water at ambient temperature and tested for 180° peel strength while still wet. The results appear in the table below.

| % PAP[1] | % Si[2] | Peel strength, lb./in. |
|---|---|---|
| 0 | 0 | 0.8 |
| 0.1 | 0.005 | 2.8 |
| 0.2 | 0.011 | 6.0 |
| 0.5 | 0.027 | 9.0 |
| 1.0 | 0.055 | 12.0 |
| 2.0 | 0.11 | 13.0 |

[1]Polymeric adhesion promoter (solids), based on total solids weight of polyurethane + polymeric adhesion promoter.
[2]Silicon, based on total solids weight of polyurethane + polymeric adhesion promoter.

EXAMPLE 5

To a 500-ml., four-necked glass reaction kettle equipped with a stirrer, thermometer, heating mantle, reflux condenser, and Dean Stark water separator there were charged 193.25 grams of 2-ethoxymethyl acetate, 55.6 grams of poly(hydroxyether) B, and 0.11 gram of organotin mercaptide catalyst, M&T Chemicals, Inc.'s Thermolite ®-31. The mixture was heated to 85° C. to effect solution. 57.75 grams of toluene were added, and the mixture was refluxed at 133° C. for 1 hour to remove water azeotropically. The mixture was cooled to 50° C. and 54.4 grams of gamma-isocyanatopropyltriethoxysilane were added. The temperature was raised to 60° C. and maintained for 4 hours, after which time infrared spectroscopic analysis showed disappearance of the isocyanate band, indicating complete reaction to produce a polymeric adhesion promoter. There was added to the reaction product 99 grams of dry methanol. The reaction product was then admixed. In varying concentrations, to several portions of polyurethane B to produce an adhesive. Additionally there were added to the adhesive compositions triethylamine, at a concentration of 1 mole per mole of silicon atoms in the polymeric adhesion promoter, to catalyst hydrolysis and condensation at the hydrolyzable groups of the polymeric adhesion promoter. Using a procedure similar to that of Example 1, canvas/aluminum laminates were prepared using the adhesives containing the varying amounts of polymeric adhesion promoter. One set of canvas/aluminum laminates was aged 3 weeks in air at ambient conditions and another set was aged 3 weeks in water at ambient temperature. The laminates were tested for 180° peel strength, with the laminates that had been aged in water tested while still wet. Results appear in the table below.

| | Peel strength, lb./in. | |
|---|---|---|
| % PAP* | Dry | Wet |
| 0 | 0.5 | 0.8 |
| 0.5 | 7 | 6 |
| 1.0 | 9 | 9 |
| 2.0 | 9 | 8 |
| 4.0 | 10 | 8 |

*Polymeric adhesion promoter (solids) as weight percentage of total adhesive composition.

EXAMPLE 6

Using procedures similar to that of Example 1, two polymeric adhesion promoters were prepared as reaction products of poly(hydroxyether) A and gamma-isocyanatopropyltriethoxysilane. One of the polymeric adhesion promoters was prepared using an isocyanate to hydroxyl ratio (NCO:OH) of 1:1, that is, by complete substitution of all the hydroxyl groups of the poly(hydroxyether). The other polymeric adhesion promoter was prepared using an isocyanate to hydroxyl ratio of 1:2. The two polymeric adhesion promoters thus produced contained 5.5% silicon and 2.75% silicon, respectively. Each of the polymeric adhesion promoters was admixed with portions of polyurethane$^B$ in varying concentrations to produce adhesives. Using procedures similar to those of Example 1, canvas/aluminum laminates were prepared using each of the adhesives. The canvas/aluminum laminates were aged 3 weeks in water at ambient temperature and tested, while wet, for 180° peel strength. The results, which appear in the table below, indicate that the adhesive containing the polymeric adhesion promoter having the higher silicon content imparted greater bond strength at all levels of polymeric adhesion promoter concentration.

| % PAP* | Peel strength, lb./in. | |
|---|---|---|
| in adhesive | 2.75% Si | 5.5%Si |
| 0 | 0.5 | 0.8 |
| 0.5 | 3.1 | 9.0 |
| 1.0 | 4.6 | 12.0 |
| 2.0 | 6.4 | 13.0 |

*PAP = polymeric adhesion promoter (solids)

EXAMPLE 7

Using the polymeric adhesion promoter produced in Example 4, several adhesives were prepared by admixng the polymeric adhesion promoter with various adhesive resins at a concentration of 2% polymeric adhesion promoter, based on total solids weight. The adhesives were then employed to bond various substrates. The bonded substrates were aged 3 weeks, with one group being aged in air at ambient conditions and another set being aged in water at ambient temperature. Peel strengths of the aged bonded substrates was tested and the results appear in the table below.

| Adhesive[1] | Bonded substrates[2] | Peel strength[3], lb./in. | |
|---|---|---|---|
| | | Dry | Wet |
| A (p) | I | 8 | 8 |
| A (c) | I | 5.6 | 4.0 |
| B (p) | II | 14 | 16 |
| B (c) | II | 0.5 | 0 |
| B (p) | III | 4 | 5 |
| B (c) | III | 1.8 | 0.1 |
| C (p) | IV | 8 | 0.2 |
| C (c) | IV | 7 | 0.1 |

-continued

| Adhesive[1] | Bonded substrates[2] | Peel strength[3], lb./in. | |
|---|---|---|---|
| | | Dry | Wet |
| C[4] | IV | 9 | 8 |

[1]First letter indicates resin:
A = Ethylene/vinyl acetate, % ethylene, viscosity cps at 25° C., applied as hot melt
B = Polyurethane C
C = Poly(hydroxyether) A
(P) indicates adhesive contains polymeric adhesion promotor
(C) indicates control, resin only.
[2]I = Aluminum foil/aluminum foil
II = Canvas/glass
III = Plasticized PVC/aluminum
IV = Canvas/aluminum
[3]180° peel (2 in./min.), except for substrate I, which was tested by "T-peel" procedure (2 in./min.)
[4]Polymeric adhesion promoter applied to aluminum as primer, resin applied separately.

When employing polymeric adhesion promoters of this invention with resins containing hydroxyl groups, such as resin C in the table above, it is preferred to apply the polymeric adhesion promoter directly to the inorganic oxide surface prior to contacting the surface with the resin.

EXAMPLE 8

A polymeric adhesion promoter was prepared by a procedure similar to that of Example 1, as the reaction product of poly(hydroxyether) A and gamma-isocyanatopropyltriethoxysilane. An adhesive composition was prepared by admixing the polymeric adhesion promoter with polyurethane B, at a concentration of 2% polymeric adhesion promoter, based on total solids weight. To a portion of the adhesive composition thus produced there was additionally added, as a hydrolysis and condensation catalyst, triethylamine, at a concentration of 1 mole per mole of silicon present in the polymeric adhesion promoter. Canvas/aluminum laminates were prepared by a procedure similar to that of Example 1, using the adhesives with and without triethylamine. Some of the canvas/aluminum laminates were aged 3 weeks in air at ambient conditions, while others were aged 3 weeks in water at ambient temperature. Both the wet and dry aged laminates prepared using the adhesive containing no triethylamine had 180° peel strengths of 13 lb./in. Both wet and dry aged laminates prepared using the adhesive which contained triethylamine had 180° peel strengths of 25 lb./in. This example indicates that base catalysts, which are known to be useful in promoting bonding of conventional monomeric coupling agents to inorganic oxide surfaces, can also be used with advantage in conjunction with the polymeric adhesion promoters of this invention.

EXAMPLE 9

This example illustrates the use of the polymeric adhesion promoters of this invention as primer coatings for adhesives. A polymeric adhesion promoter was produced by reacting poly (hydroxyether) A with gamma-isocyanatopropyltriethoxysilane at an isocyanate to hydroxyl ratio of 1:1, at room temperature in methyl ethyl ketone (20% solids) until infrared spectroscopic analysis indicated complete disappearance of the isocyanate band. The reaction product was employed without removal of the reaction solvent. The polymeric adhesion promoter was applied with a cloth by hand to two aluminum lap shear test strips (B-209, Alloy 2024, temper T-3, as specified in ASTM D-1002-64) as a primer. The two primed aluminum strips were then bonded in a lap shear test configuration with an epoxy resin A and curing agent A, applied to the primed area. Glue line thickness was 3 mils. Several sets of lap shear test samples were prepared in the foregoing manner. As controls, several sets of lap shear test samples were prepared in a similar manner using unprimed aluminum sheets. The lap shear test samples were aged under varying conditions of humidity and temperature, as shown in the table below, and tested for lap shear strength (ASTM D-1002-64,0.05 in./min. crosshead speed). The results, reported in the table, indicate that both the primed and unprimed samples underwent little or no loss of lap shear strength when aged at 0% relative humidity, but that the unprimed samples underwent a much greater loss of lap shear strength than the primed samples when aged at 100% relative humidity.

| | Aging conditions | Lap shear, lb./in. |
|---|---|---|
| Unprimed | day, ambient temp. & humidity, | 4,200 |
| | 50 days, 40° C., 100% RH* | 2,900 |
| | 99 days, 40° C., 100% RH | 2,500 |
| | 99 days, ambient temp., 0% RH | 4,300 |
| Primed | 1 day, ambient temp. & humidity | 4,300 |
| | 70 days, 40° C., 100% RH | 4,000 |
| | 70 days, ambient temp., 0% RH | 4,200 |

*Relative humidity

EXAMPLE 10

This example illustrates the use of the polymeric adhesion promoters of this invention in the treatment of particulate fillers for resins. To a Patterson Kelly twin shell blender there were charged 8 lbs. of alumina trihydrate particles (C-331) supplied by Alcoa Aluminum Co.). With the shell roatating, there was sprayed in through the liquid entry port a 10% solution in a 95:5 methanol: water mixture of a polymeric adhesion promoter which was produced in a similar manner to that of Example 1, in an amount sufficient to provide 1% polymeric adhesion promoter solids, based on the weight of the alumina trihydrate. After all the polymeric adhesion promoter was charged, mixing was continued for 10 minutes and the treated alumina trihydrate was discharged into a tray and heated at 100° C. for 1 hour. To 100 parts of a low molecular weight liquid polyester resin (GR-13021, supplied by Marco Corp.) there were added 175 parts of the treated alumina trihydrate by blending for 2 hours in a hot water bath at 190° F. Using a Brookfield Syncho-Lectric viscometer model RVT, the Brookfield viscosity of the filled polyester resin was measured at various spindle speeds with a No. 6 spindle at room temperature. As a control, the viscosity of the same resin filled with untreated alumina trihydrate was measured and the results appear in the table below. The comparatively small increase in viscosity exhibited by the resin containing the treated filler as spindle speed was increased is generally considered to be an indication of good filler wetting and dispersion stability.

| Spindle speed, rpm | Brookfield viscosity, cps. × 10$^{-3}$ | |
|---|---|---|
| | Treated | Untreated |
| 1.0 | 39 | 45 |
| 2.5 | 54 | 48 |
| 5.0 | 63 | 52 |
| 10.0 | 67 | 50 |

| | Brookfield viscosity, cps. × 10⁻³ | |
|---|---|---|
| Spindle speed, rpm | Treated | Untreated |
| 20.0 | — | 47 |

EXAMPLE 11

The polymeric adhesion promoter of this invention was compared with conventional coupling agents as a primer for polysulfide sealants on concrete. The concrete blocks, which were prepared in accordance with ASTM-D-1191-52-T, were primed by wiping on a 5% solution of the coupling agent or polymeric adhesion promoter. Onto each primed block were placed beads of a mixture of a liquid polysulfide resin and a lead dioxide curing agent. The sealant was aged for 7 days at ambient conditions and then the blocks were immersed in water at room temperature for 3 weeks. The bond between the sealant and concrete was then tested by manually attempting to peel the sealant away from the block. Results appear in the table below.

| Primer | Reactivity with resin | Wet bond strength |
|---|---|---|
| None | — | Failed |
| I | Yes | Excellent |
| II | No | Failed |
| III | No | Failed |
| IV | No | Failed |
| V | No | Failed |
| VI | No | Failed |
| VII | No | Excellent |

I = gamma-mercaptopropyltrimethoxysilane
II = beta-(3,4-epoxycyclohexyl)ethyltrimethoxysilane
III = vinyl-tris(2-methoxyethoxy)silane
IV = methyltrimethoxysilane
V = phenyltriethoxysilane
VI = gamma-methacryloxypropyltrimethoxysilane
VII = polymeric adhesion promoter produced by reacting poly (hydroxyether) A and gamma-isocyantopropyltriethoxysilane (NCO:OH = 1:1)

What is claimed is:

1. A polymeric organosilicon compound characterized by the repeating unit

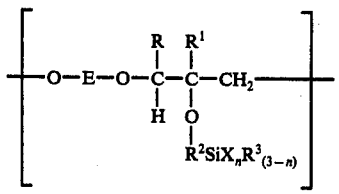

wherein R and R¹ are each, individually, hydrogen or methyl; E is the residue obtained by removing the hydroxyl groups from a dihydric polynuclear phenol in which the hydroxyl groups are attached to different nuclei; R² is a divalent organic radical; R³ is hydrogen or alkyl of up to 4 carbon atoms; n is an integer having a value of from 1 to 3; and X is a hydrolyzable groupm,
said compound having a weight average molecular weight of from 1,000 to 100,000 and containing from 0.5 to 5.5 weight per cent silicon.

2. A polymeric organosilicon compound as claimed in claim 1, wherein E has the structure

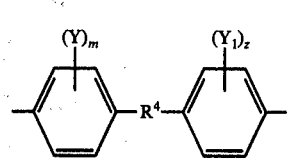

wherein $R^4$ is alkylene or alkylidene of from 1 to 3 carbon atoms; Y and $Y_1$ are each, individually, alkyl of 1 to 4 carbon atoms or alkoxy of 1 to 4 carbon atoms; and m and z are each, individually, integers having values of from 0 to 0.4.

3. A polymeric organosilicon compound as claimed in claim 1, wherein the weight average molecular weight is from 10,000 to 60,000.

4. A polymeric organosilicon compound as claimed in claim 1, wherein the silicon content is from 2 to 5.5 weight per cent.

5. A polymeric organosilicon compound as claimed in claim 1, wherein R² has the structure

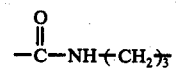

6. A polymeric organosilicon compound as claimed in claim 1, wherein n has a value of 3.

7. A method of improving adhesion between a resinous medium and an inorganic oxide material which comprises admixing with the resinous medium, prior to contacting it with the inorganic oxide material, from 0.1 to 10 weight per cent, based on the weight of the resinous medium, of a polymeric organosilicon compound characterized by the repeating unit

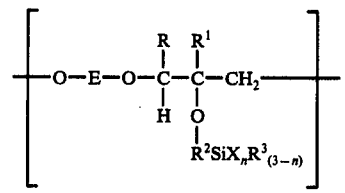

wherein R and R¹ are each, individually, hydrogen or methyl; E is the residue obtained by removing the hydroxyl groups from a dihydric polynuclear phenol in which the hydroxyl groups are attached to different nuclei; R² is a divalent organic radical; R³ is hydrogen or alkyl of up to 4 carbon atoms; n is an integer having a value of from 1 to 3; and X is a hydrolyzable group,
said compound having a weight average molecular weight of from 1,000 to 100,000 and containing from 0.5 to 5.5 weight per cent silicon.

8. A method as claimed in claim 7, wherein said polymeric organosilicon compound is employed at a concentration of from 0.5 to 2.0 weight per cent.

9. A method of improving adhesion between a resinous medium and a particulate or fibrous inorganic oxide material which comprises applying to the surface of the particulate or fibrous inorganic oxide material, prior to contacting it with the resinous medium, from 0.1 to 10 weight per cent, based on the weight of the particulate or fibrous inorganic oxide material, of a polymeric organosilicon compound characterized by the repeating unit

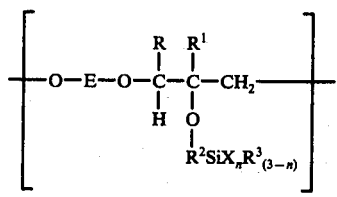

wherein R and $R^1$ are each, individually, hydrogen or methyl; E is the residue obtained by removing the hydroxyl groups from a dihydric polynuclear phenol in which the hydroxyl groups are attached to different nuclei; $R^2$ is a divalent organic radical; $R^3$ is hydrogen or alkyl of up to 4 carbon atoms; $n$ is an integer having a value of from 1 to 3; and X is a hydrolyzable group, said compound having a weight average molecular weight of from 1,000 to 100,000 and containing from 0.5 to 5.5 weight per cent silicon.

10. A method as claimed in claim 9, wherein said polymeric organosilicon compound is employed at a concentration of from 0.5 to 5.0 weight per cent.

11. A method of improving adhesion between a continuous surface of inorganic oxide material and a resinous medium which comprises applying to the continuous surface as a primer coating from 0.05 to 1.5 grams/m² of a polymeric organosilicon compound characterized by the repeating unit

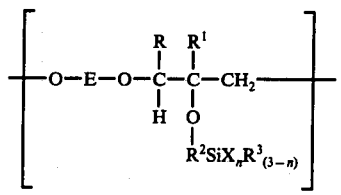

wherein R and $R^1$ are each, individually, hydrogen or methyl; E is the residue obtained by removing the hydroxyl groups from a dihydric polynuclear phenol in which the hydroxyl groups are attached to different nuclei; $R^2$ is a divalent organic radical; $R^3$ is hydrogen or alkyl of up to 4 carbon atoms; $n$ is an integer having a value of from 1 to 3; and X is a hydrolyzable group, said compound having a weight average molecular weight of from 1,000 to 100,000 and containing from 0.5 to 5.5 weight per cent silicon.

12. A method as claimed in claim 11, wherein the amount of said polymeric organosilicon compound employed is from 0.3 to 0.7 grams/m².

* * * * *